Feb. 8, 1966 J. M. AMMERMAN 3,233,856

ARTICLE HOLDING DEVICE

Filed July 1, 1963

INVENTOR.
JOHN M. AMMERMAN
BY
Morris Rabkin
Attorney

United States Patent Office 3,233,856
Patented Feb. 8, 1966

3,233,856

ARTICLE HOLDING DEVICE

John M. Ammerman, Indianapolis, Ind., assignor to Radio Corporation of America, a corporation of Delaware Filed July 1, 1963, Ser. No. 291,888
7 Claims. (Cl. 248—229)

This invention relates to a means for holding an article firmly but removably in a relatively fixed position with respect to a support, and particularly to a means for holding an object, such as a filter capacitor, firmly on the chassis base of a piece of electrical equipment, such as a radio or a television receiver, and yet permitting relatively easy removal of the object without need for supplementary tools or hardware when replacement thereof is necessary.

One method of holding a filter capacitor on a chassis base is by riveting the base of the capacitor to the base of the chassis. This method uses riveting equipment for fixing the capacitor on the chassis base, and the removal of rivets for replacement of the capacitor. Another method of holding a filter capacitor is to rivet a spring clip having resilient fingers to the base of the chassis, and then to place the capacitor between the resilient fingers of the clip. This method also employs riveting equipment for fixing the clip to the chassis base. Moreover, the easily removable capacitor may fall out from between the spring fingers due to vibrations or jarring experienced by the equipment when it is moved.

It is therefore an object of this invention to provide a device for firmly, yet removably, mounting an object, such as a filter capacitor, on the base of a chassis.

It is a further object to provide such a mounting device that does not require rivets or other similar fastening means.

It is a further object to provide an improved mounting device which is especially useful for mounting a cylindrical object on a support.

In accordance with the invention, a clip is provided having a substantially planar body portion as well as at least one spring finger and at least one spring tongue. The tongue is bent to overlie at least part of the body portion of the clip to form a groove adapted to receive a flange on a supporting member, such as the chassis base of a radio or a television receiver. The finger is bent back on itself, to one side of the plane of the body portion, and is shaped to hold a circular cylindrical or other object resiliently. When the clip holding the object is mounted on the supporting flange with a portion of the flange in the groove, the object is held by the spring finger resiliently against an adjacent wall from which the flange may extend. Motion of the cylindrical object away from the wall, as well as along the wall but away from the plane of the planar body portion of the clip is resiliently resisted by the spring finger. Motion of the object along the wall and in the direction towards the body portion of the clip is resiliently resisted by the engagement of the supporting flange in the groove of the clip.

According to a feature of the invention, the supported object and the clip supporting member may be interengaged to prevent sliding of the object along the wall in directions parallel to both the flange and the wall. Furthermore, a plate may be provided perpendicular to the wall to limit or prevent motion of the object in a direction away from the plane of the body portion of the clip.

The novel features of this invention, both as to its organization and method of operation, as well as additional objects and advantages thereof, will be understood more readily when read in conjunction with the accompanying drawing, in which.

Figures 1, 2, 3, 4, 5, 6:
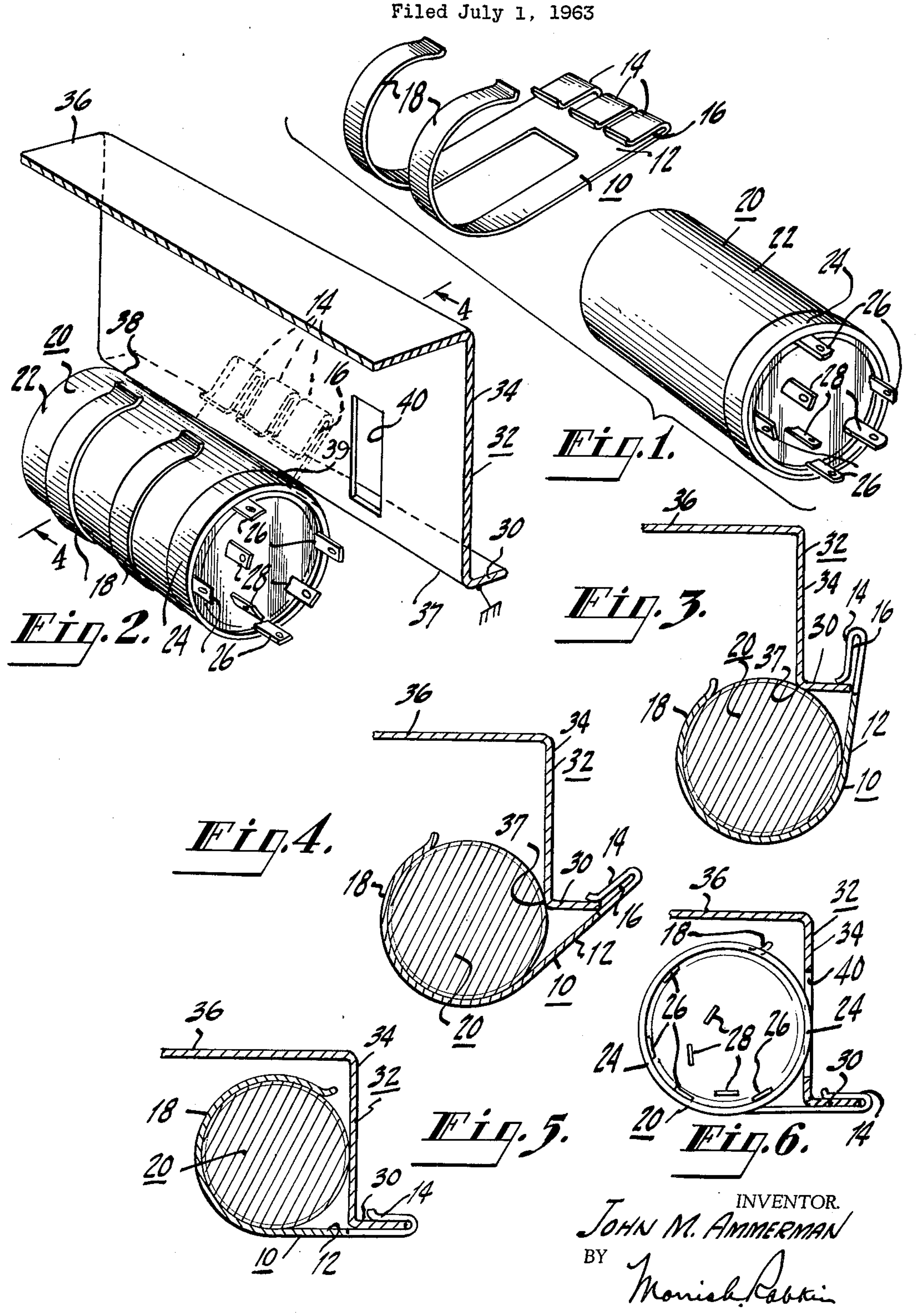
FIGURE 1 is an exploded perspective view of a clip in accordance with this invention and of an object to be held thereby.
FIGURE 2 is a perspective view of the clip and the object of FIGURE 1, illustrating the mounting of the object on a portion of a chassis base.
FIGURE 3 is a partly diagrammatic and partly sectional view taken on the line 4—4 of FIGURE 2 and showing one step in the method of mounting the object and the clip on the chassis base.
FIGURE 4 is a view similar to FIGURE 3 but showing a further step in the method of mounting the object and the clip on the chassis base.
FIGURE 5 is a view similar to FIGURES 3 and 4 and showing the object and the clip in fully mounted position on the chassis base.
FIGURE 6 is a view illustrating the interengagement of the object and the chassis base.

Referring, now, to FIGURE 1, there is shown a clip 10 comprising a body portion 12 having opposed, planar, side surfaces as well as opposed edges. The clip 10 further comprises one or more tongues 14 extending from one edge of the body portion 12 and bent to overlie a planar side surface of the body 12 in slightly spaced relation thereto. The body portion 12 and the tongues 14 thus provide one or more grooves or spaces 16 therebetween to receive a clip supporting flange, as will be explained more particularly hereinafter. The ends of the tongues 14 are bent away somewhat from the body portion 12 to facilitate entry of the supporting flange into the groove 16.

The clip 10 further comprises one or more spring fingers 18 extending laterally from the opposite edge of the body portion 12 and away from the groove 16. Each spring finger 18 is bent along at least a portion of its length in a curvilinear manner to one side of (above, as viewed in FIG. 1) the plane of the planar portion 12 and back on itself to form a resilient object holding portion or bight as will be explained shortly. The tips of the fingers 18 are bent outwardly away from the body portion 12 to facilitate insertion of an object in the bight of the fingers. While three tongues 14 and two fingers 18 are shown in FIGURE 1, one or more tongues 14 and one or more fingers 18 may be provided to suit various requirements or convenience. Also, fingers 18 are shown as being continuously curled into substantially C form, since the C form is particularly desirable for a circularly cylindrical body. However, the fingers may be bent to conform to the peripheral surface of any object to be held thereby. As shown in the drawing, the clip 10 may be made from one piece of sheet spring metal bent on its final form.

The circular cylindrical object to be held by the clip 10 is illustrated in FIGURE 1 as being a filter capacitor 20 having a cylindrical portion 22 and an enlarged cylindrical flange portion 24. The capacitor is provided with ground terminals 26 and capacitor terminals 28 in a known manner. The capacitor 20 is held by the clip 10, as illustrated in FIGURES 2–5, by forcing the capacitor 20 into position where it is resiliently embraced by the fingers 18.

The clip 10, holding the capacitor 20, is then mounted on a supporting flange 30 of a supporting member 32 in the manner shown in FIGURES 2–6. The support 32, which may be a portion of a chassis base of an electrical equipment, comprises the flange 30, a wall 34, and a plate 36. The flange 30 may be integral with the wall 34 and extend at an angle thereto, shown as a right angle, in one direction from the wall 34 along one side edge thereof. Therefore, if the junction 37 of the wall 34 and the flange 30 are considered to be the origin of Cartesian coordinates, the wall 34 separates two adjacent quadrants, and the wall 34 and the flange 30 cooperate to define one of said adjacent quadrants. The plate 36 extents from the wall 34 in the direction opposite to that of the flange 30, that is, into the other of said adjacent quadrants, and is spaced from and is substantially parallel to the flange 30.

In mounting the clip 10 and the capacitor 20 on the flange 30, the outwardly turned ends or tips of the tongues 14 are placed against the flange 30, as shown in FIGURES 2 and 3, with the capacitor 20 contacting the junction 37 of the wall 34 and the flange 30 at spaced points 38 and 39 along the surface of the capacitor. As will be seen from FIGURE 2, a substantially triangular space will appear between the junction 37 and the capacitor 20 by reason of the fact that the flange portion 24 of the capacitor 20 has a larger diameter than does the cylindrical portion 22 thereof. Then, as illustrated in FIGURE 4, using this junction 37 as a fulcrum, the clip 10 and the capacitor 20 are forced up and to the left (i.e., clockwise, as viewed in FIGURE 4) until the capacitor 20 lies almost wholly in the fourth quadrant. At this position of the clip 10 and the capacitor 20, illustrated in FIGURE 5, the end of the flange 30 contacts the bottom of the groove 16. In moving the clip 10 up, as described above, the spring fingers 18 are resiliently stretched and stressed until a position such as the position shown in FIGURE 4 is reached. As the flange 30 enters the groove 16 and as the capacitor 20 is moved upward (as viewed in FIGURE 4) in contact with the wall 34, the spring fingers 18 contract and hold the capacitor resiliently against the wall 34. In the process of mounting the capacitor on the chassis base 32, the spring fingers 18 therefore resiliently resist motion of the capacitor upwardly and to the left (as viewed in FIGURE 4) until a certain angular position, illustrated in FIGURE 4, is reached. Upon continued motion beyond this angular position, the spring fingers contract and assist in moving the capacitor 20 up and along the wall 34. In mounting the clip 10 on the flange 30, the groove 16 is not opened to any great extent.

In the mounted position of the clip 10, shown in FIGURE 5, the spring fingers 18 are under stress and resist motion of the capacitor 20 to the left (that is, away from the wall 34), as well as up along wall 34. The downward motion of the capacitor 20 is resisted by the spring fingers 18 and also by the stiffness of the clip body portion 12 due to the fact that the tongues 14 and the body portion 12 contact opposite sides of the flange 30 and oppose rotary motion of the clip 10 with respect to the flange 30. Also, motion of the capacitor 20 in an upward direction, as viewed in FIGURE 5, is limited by the plate 36.

As thus far described, only sliding friction opposes motion of the capacitor 20 along a line parallel to both the wall 34 and the flange 30 (i.e., axially of the capacitor). As shown in FIGURES 2 and 6, a rectangular hole 40 is provided in the wall 34 of a size and shape to receive a portion of the enlarged cylindrical flange 24 of capacitor 20. When the flange 24 is received in the hole 40, as shown by FIGURE 6, motion of the capacitor 20 in a direction parallel to the wall 34 and the flange 30 is resisted by the interengagement of the wall 34 and the capacitor 20. This interengagement may be supplied by a projecting portion of the capacitor 20 that extends along only a portion of the circumference of the capacitor and extends into a hole in the wall that may be smaller than the hole 40. Also, the interengagement may be supplied by a boss or bosses (not shown) on the side of the wall 34 toward the capacitor 20 and contacting the ends of the capacitor 20, or contacting a groove or an indentation (not shown) in the capacitor 20.

In FIGURE 5, the flange 30 is shown as contacting the bottom of the groove 16. Alternatively, the tongues 14 may contact the right side of the wall 34 (as viewed in FIGURE 5), thereby preventing the flange 30 from extending to the bottom of the groove 16. For the proper operation of this device, the engagement of the flange 30 in the groove 16 should be sufficient to resist rotation of the clip with respect to the flange 30 in a plane perpendicular to said flange 30. As shown in the several figures, the tongues 14 extend parallel to the body portion 12. Instead, if desired, the tongues 14 and the body portion 12 may extend at a small angle to each other if sufficient engagement of the flange and the groove results.

To remove the capacitor and clip from the support 32, the capacitor 20 and clip 10 are forced downward, as viewed in FIGURE 5, with the capacitor 20 in contact with the wall 34. This downward motion causes the groove 16 to open, since the flange 30 springs the tongues 14 away from the body portion 12. The downward motion is continued until the groove 16 opens far enough to permit the clip 10 to rotate with respect to the flange 30 to the angular position at which the flange 30 is out of the groove 16, whereupon the clip 10 slips off of the flange 30.

In this process of taking the clip 10 off the flange 30, the fingers 18 are stretched less than in the process of mounting the clip 10 on the flange. Conversely, in the process of mounting the clip on the flange, its grooves 16 are opened little, if at all, while the fingers 18 are stretched a substantial amount, as explained above. Since more force is used to open the grooves 16 which are bounded by the short, relatively stiff tongues 14, than is used to stretch the relatively long, limber fingers 18, more force is required to dismount the capacitor 20 and clip 10 from the flange 30 than to mount the capacitor and clip on the flange. Therefore, the clip and capacitor are easily mounted, but once the clip and the capacitor are mounted in place on the chassis base as described above, the capacitor 20 is held firmly in place against accidental displacement or dislodgement therefrom.

Another method of removing the capacitor 20 and clip 10 from the chassis base 32 comprises placing the thumb against the edge of the body portion 12 of the clip 10 and the fingers around the capacitor 20 and the clip 10. Then, by pressing the thumb towards the wall 34 and simultaneously rotating the capacitor 20 and the clip 10 about the junction 37 in a direction away from the plate 36, the capacitor and the clip are easily dismounted from their supporting flange 30. This method of removing the capacitor and clip involves a combination of forces not normally experienced by a television or radio chassis.

Although only a single clip structure particularly adapted to mount a capacitor on a chassis base has been described, it will undoubtedly be apparent to those skilled in the art that variations are possible within the spirit of the present invention. Hence, it should be understood that the above described clip and object mounted thereby are to be considered illustrative and not in a limiting sense.

What is claimed is:

1. A clip for holding an object, said clip comprising
 (a) a planar body portion with opposed surfaces,
 (b) a tongue extending from and overlying said body portion at one said surface thereof and separated therefrom by a support receiving groove, said groove being capable of receiving a support,
 (c) a resilient finger extending from said body portion, the free end of said finger being disposed laterally of and overlying said one surface of said body portion and said finger being bent back on itself to form an object holding bight, said finger being formed resiliently to resist motion of an object held thereby with respect to said clip in directions transverse to the peripheral surface of said object, said bight and said groove facing each other.

2. A clip for mounting an object on a support, said clip comprising a member having
 (a) a planar body portion including opposed sides and opposed edges,
 (b) resilient tongue extending from one of said edges and overlying said body portion at one said side thereof for mounting said clip on said support, and (c) an object engaging finger extending laterally from said body portion at the opposite one of said edges, said finger being curled to said one side of said body portion to receive said object therein and to grip and hold said object in predetermined relation to said support when said clip is mounted thereon by means of said tongue, said finger and said tongue extending towards each other.

3. In combination, (a) a wall, (b) a flange extending from said wall to one side thereof, (c) a clip having a flange receiving portion, said clip also having a spring finger bent back on itself and shaped to hold an object, said flange being positioned in said flange receiving portion of said clip and said spring finger extending back towards said wall, and (d) an object held by said spring finger and positioned on the opposite side of said wall from said flange.

4. In combination, (a) a wall, (b) a flange extending from one side of said wall in one direction, (c) a clip having a flange receiving portion within which said flange is received whereby said clip is mounted on said flange with said clip extending beyond said wall in the opposite direction, said clip including a spring finger bent back on itself beyond and towards said wall to form an object holding portion for holding an object against the other side of said wall, and (d) an object held in said object holding portion of said finger.

5. A spring clip for mounting an object on a support having a wall and a flange extending laterally from said wall, said clip comprising (a) a resilient member having a planar body portion including opposed side surfaces, (b) a resilient tongue extending from and overlying said body portion in slightly spaced relation thereto at one side thereof to provide a space for receiving said flange and thereby mounting said clip on said support, and (c) a resilient object engaging finger extending from said body portion away from said one side thereof, said finger being curled into a substantially C-shaped bight to receive said object therein and to grip and hold said object against said wall when said clip is monuted on said flange by means of said tongue, said space and said bight facing each other.

6. In combination, (a) a wall, (b) a flange extending angularly from said wall to one side thereof, and (c) a clip having a flange receiving portion into which said flange extends whereby said clip is mounted on said flange, said clip having a body portion extending beyond the other side of said wall, and (d) a spring finger extending from said body portion, said spring finger being bent back on itself to form a cylindrical object holding portion, said object holding portion being substantially wholly on one side of said body portion, said flange receiving portion and said spring fingers being on the same side of said body portion and facing each other.

7. In combination with a supporting member having a wall separating a pair of adjacent quadrants and a flange extending from said wall and cooperating therewith to define one of said quadrants, (a) a clip for resiliently holding an object in a desired relation to said wall, said clip comprising (1) a flange receiving portion into which said flange extends whereby said clip is mounted on said flange, said flange receiving portion and said flange cooperating to resist angular motion of said clip with respect to said flange in a plane perpendicular to said flange, and (2) an object holding spring finger having a portion disposed in the other of said adjacent quadrants for holding an object therein, and (b) an object gripped by said spring finger and supported thereby in the other quadrant.

References Cited by the Examiner

UNITED STATES PATENTS

| | | | |
|---|---|---|---|
| 533,024 | 1/1895 | Smith | 139—216 |
| 2,278,691 | 4/1942 | Cotter | 24—73 |
| 2,472,058 | 6/1949 | Artley | 248—108 |
| 2,672,314 | 3/1954 | Mitchell | 248—301 |

FOREIGN PATENTS

| | | |
|---|---|---|
| 461,277 | 2/1937 | Great Britain. |

CLAUDE A. LE ROY, *Primary Examiner.*